(12) United States Patent
Stanford et al.

(10) Patent No.: US 6,364,208 B1
(45) Date of Patent: Apr. 2, 2002

(54) CARD CHANGING SYSTEM

(75) Inventors: John Stanford, Harpenden (GB); Eduard Karel De Jong, San Mateo, CA (US)

(73) Assignee: Transmo Limited, Royston (GB)

( * ) Notice: Subject to any disclaimer, the term of this patent is extended or adjusted under 35 U.S.C. 154(b) by 0 days.

(21) Appl. No.: 09/417,808

(22) Filed: Oct. 14, 1999

Related U.S. Application Data (63) Continuation-in-part of application No. 09/280,361, filed on Mar. 29, 1999.

(51) Int. Cl.[7] .............................................. G06K 19/06
(52) U.S. Cl. ........................ 235/492; 235/380; 235/384
(58) Field of Search ................................ 235/384, 380, 235/492

(56) References Cited

U.S. PATENT DOCUMENTS

| | | | |
|---|---|---|---|
| 4,825,050 A | | 4/1989 | Griffith |
| 5,351,187 A | * | 9/1994 | Hassett ........................ 235/384 |
| 5,382,780 A | * | 1/1995 | Carmen ....................... 235/384 |
| 6,019,285 A | * | 2/2000 | Isobe et al. .................. 235/384 |
| 6,039,247 A | * | 3/2000 | Reccia et al. ................... 902/2 |
| 6,065,675 A | * | 5/2000 | Feicher ........................... 902/2 |
| 6,085,976 A | * | 7/2000 | Sehr ............................. 235/384 |
| 6,098,879 A | * | 8/2000 | Terranova .................... 235/384 |
| 6,125,988 A | * | 10/2000 | Waters ........................ 194/217 |

FOREIGN PATENT DOCUMENTS

| | | | |
|---|---|---|---|
| EP | 0 237 815 | | 9/1987 |
| GB | 9405362 | * | 3/1994 |
| GB | 2 287 565 | | 9/1995 |

* cited by examiner

Primary Examiner—Harold I. Pitts
(74) Attorney, Agent, or Firm—Lee, Mann, Smith, McWilliams Sweeney & Ohlson

(57) ABSTRACT

There is described a card charging system comprising:
(a) one or more smart card reading devices;
(b) a transaction recording-payment facility; and
(c) one or more security modules located between the one or more reading devices and the transaction recording-payment facility.

The transaction facility is operable to receive signals from the one or more security modules to enable a purchase to be made in return for an amount of credit debited from a card; the one or more security modules record individual use of the card in respect of time and amount debited. The system further includes a clearing center to which information is transmitted from the one or more security modules to order the clearing center to keep a record of the location of each security module, whereby the clearing center is enabled to keep up to date a log of individual card usage, the clearing center log including the time and location of each card transaction, as well as any remaining credit on the card, and wherein the clearing center incorporates means for identifying any inconsistencies in the log with respect to the card credit and the locations and times of transactions.

7 Claims, 11 Drawing Sheets

Fig. 2

Migration path via the TSM

Fig. 4

SECURITY AND TRANSACTION DEVICE
AT POINT OF SALE

Fig. 6
CLEARING AND SETTLEMENT SYSTEM BLOCK DIAGRAM

Fig. 7
LOGIC DIAGRAM

Fig. 8 BLOCK SCHEMATIC SHOWING HOW HOST MACHINE CALCULATES FARES PAYABLE

Fig. 9
BLOCK DIAGRAM TO SHOW CARD ERROR STORAGE DEVICE

Fig. 10

Fig. 11 THE CLEARING CENTRE

Fig.12 CARD TO CLEARING CENTRE INFORMATION FLOW (INDIVIDUAL CARD DATA)

Fig.13

CLEARING CENTRE FAULT RECORDING

Fig. 14

SECURE DEVICE ALLOCATION

CARD CHANGING SYSTEM

RELATED APPLICATION

This application is a continuation-in-part of co-pending U.S. patent application Ser. No. 09/280,361, filed Mar. 29, 1999.

This invention concerns card charging systems of the type in which a pre-programmed card is read and validated by a suitable card reader and data stored on the card is decremented according to the cost of a purchase made available to the user after the transaction. Each system of the invention includes a security module to ensure correct control between a card read/write unit and a transaction recording-payment collection facility. Each system thus forms an integral part of a revenue allocation process.

BACKGROUND

It is known to provide coin, token or card operated devices for the collection of payment for goods or services. Such devices are employed in, for example, bus fare collection systems, pay and display parking systems, and prepared food delivery systems. Such devices may be capable of debiting prepaid or credit cards, the devices operating in a similar manner to the systems currently in use for the provision of telecommunication services and systems for handling prepayment credit cards for obtaining bus journeys and tickets for train journeys.

According to the invention of our granted U.K. Patent No. 2287565, there is provided a security and transaction recording device for use in connection with a card read/write device comprising: signal transmission means for delivering signals to a host facility to enable a purchase to be made in return for an amount of credit debited from a card after the latter has been read by a card reader, which signals comprise a unique identification number together with signals defining a public key-based security system; a record keeping subsystem adapted to certify a credit debited from the card and identify which one of a plurality of accounts is to receive the debited credit; and signal processing and output means for generating signals indicative of a successful transaction; so that in use the generated signals indicate to the host facility the nature of the transaction completed and the purchase which is now to be made available.

The host facility may be a service providing facility where the purchase involves provision of a service such as transportation, seating in an auditorium or the like.

Alternatively the host facility may be a product providing facility where the purchase involves supply of a product such as foodstuffs, clothing, medication and the like.

Optionally the device includes a smart card reader and further signal processing means, whereby a smart card open payment system may be employed in lieu of a prepayment credit card system, for payment for a service or commodity.

The security and transaction recording device described in the aforesaid UK Patent No. 2287565 is designed primarily to process value collected by Transmo Security Modules (TSMs) fitted to each point of sale designed to accept "Transmo" pre-paid cards. The system's prime function, therefore, is to collect and process payments, expressed as total value and number of transactions per card issuer, from each TSM.

The inventors have appreciated that the recording device described in the UK Patent No. 2287565 can be considerably expanded in the following areas to improve its functionality and performance, namely to provide:

(a) Result file processing;
(b) Improved TSM assignment handling;
(c) Flexible report and Query handling;
(d) Automated settlement file production;
(e) Automated concessionary revenue apportionment;
(f) Card recharging option;
(g) System service reliability monitoring; and
(h) Card serial number tracking and hot card determination/handling Objects of the present invention are to provide improved card charging systems, in particular card charging systems including security and transaction features.

While a stored value card is eminently suitable as a payment device, there exists a demand to offer a service that ensures the correct allocation of revenue in a subsidised payment scheme, such as a subsidised travel scheme. To this end, many urban transit developments plan to use contactless "smart cards" (CICC) for season tickets/concessionary fares.

SUMMARY OF THE INVENTION

According to the present invention, there is provided a card charging system comprising:
  (a) one or more smart card reading devices;
  (b) a transaction recording-payment facility; and
  (c) one or more security modules located between the one or more reading devices and the transaction recording-payment facility,
the transaction facility operable to receive signals from the one or more security modules to enable a purchase to be made in return for an amount of credit debited from a smart card, wherein the one or more security modules record individual use of the smart card in respect of time and amount debited, the system further including a clearing centre to which information is transmitted from the one or more security modules to order the clearing centre to keep a record of the location of each security module, whereby the clearing centre is enabled to keep up to date a log of individual smart card usage, the clearing centre log including the time and location of each smart card transaction, as well as any remaining credit on the smart card, and wherein the clearing centre incorporates means for identifying any inconsistencies in the log with respect to the card credit and the locations and times of transactions.

The card reader is preferably adapted to read contactless smart cards.

In the card charging system, the clearing centre log preferably includes the exact time and location of each smart card transaction, as well as any remaining credit on the card.

In order to highlight possible fraudulent card use, or counterfeit cards, the clearing centre of the card charging system may incorporate means for identifying any inconsistencies in the log with respect to the smart card value and the locations and times of transactions.

Preferably in such a card charging system, the clearing centre may have means for flagging cards giving rise to inconsistencies in the log.

In a preferred arrangement, the clearing centre stores the remaining credit on each smart card in association with a serial number allotted to the card.

Preferably, the security and transaction device is able to store data relating to a, large plurality of smart cards and selectively simultaneously transmit some or all the data to the clearing centre.

DETAILED DESCRIPTION OF THE DRAWINGS

Embodiments of the invention will now be described, by way of example only, with reference to the accompanying drawings in which.

Figure 1:
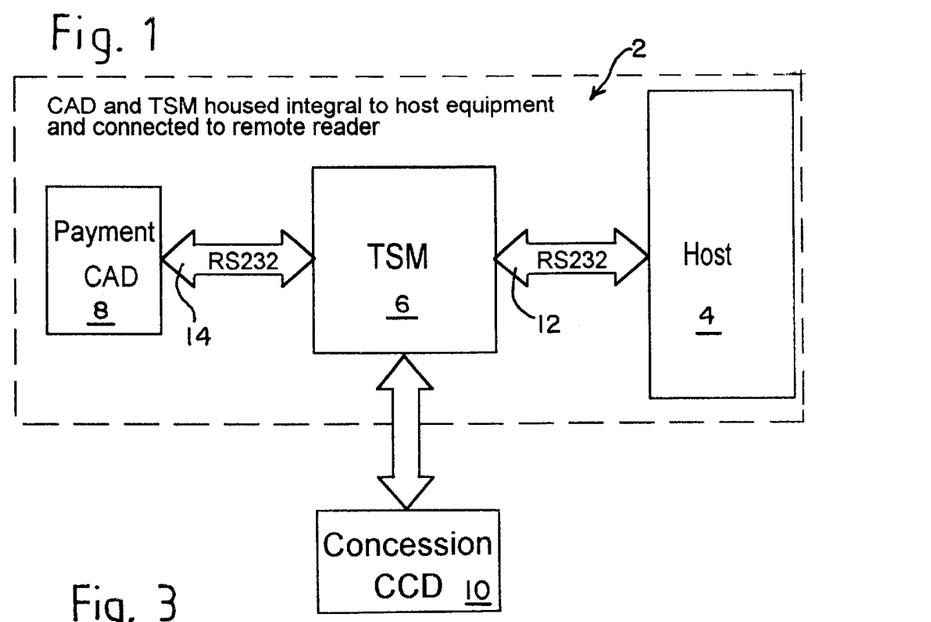
FIG. 1 is a schematic diagram of a card charging system according to the invention incorporating a security module.
Figure 2:
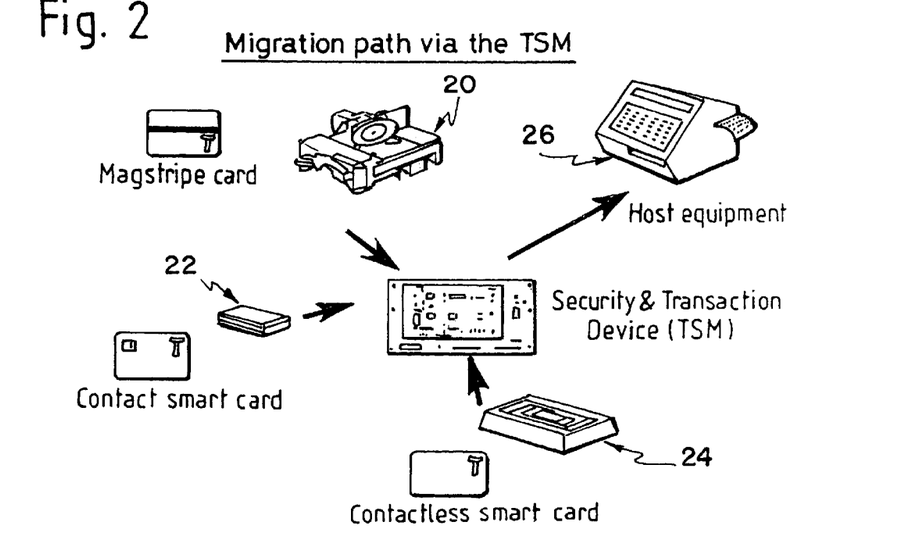
FIG. 2 is a depiction of FIG. 1 wherein the security module of the system is capable of simultaneously accepting signals from several sources shown.

Returning now to FIG. 1, there is shown a card charging system or host facility 2 integrally incorporating a host device 4, a security module (TSM) 6 and a credit and payment read/write device (CAD) 8. The host facility 2 also includes a contactless card reader (CCD) 10 for use by concession holders (not shown in FIG. 1) interfaced therewith. The TSM module 6 is capable of simultaneously accepting signals from a magnetic stripe card reader 20, a contact smart card reader 22 and a contactless smart card detector 24 as shown in FIG. 2, and feed relevant information to host equipment 26.

Thus, the TSM 6 is capable of handling input from multiple card acceptors simultaneously. This parallel operation allows contactless cards mainly used for concessions and other types of payment card to be read at the same time.

Figure 3:
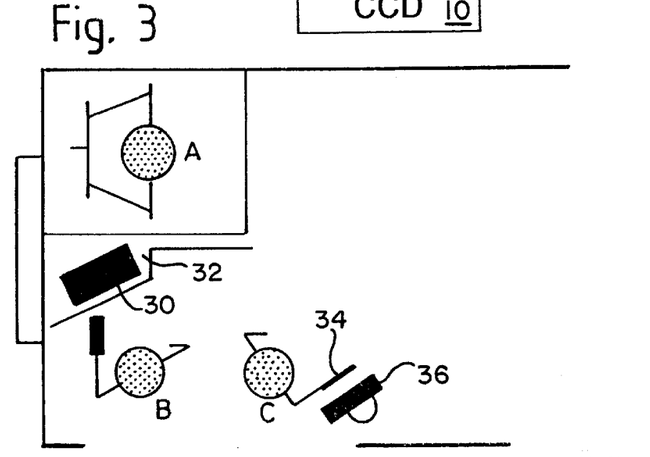
FIG. 3 is a schematic illustration of two card holders A, B simultaneously using the card charging system.

In order to further exemplify such simultaneous operation, reference is made to FIG. 3. In FIG. 3 a driver A issues a ticket to a stored value cardholder B via a card acceptor 30 mounted on a ticket machine 32, whilst a concessionary cardholder C momentarily presents a contactless card 34 to a remote card acceptor 36, when no ticket is required.

Figure 4:
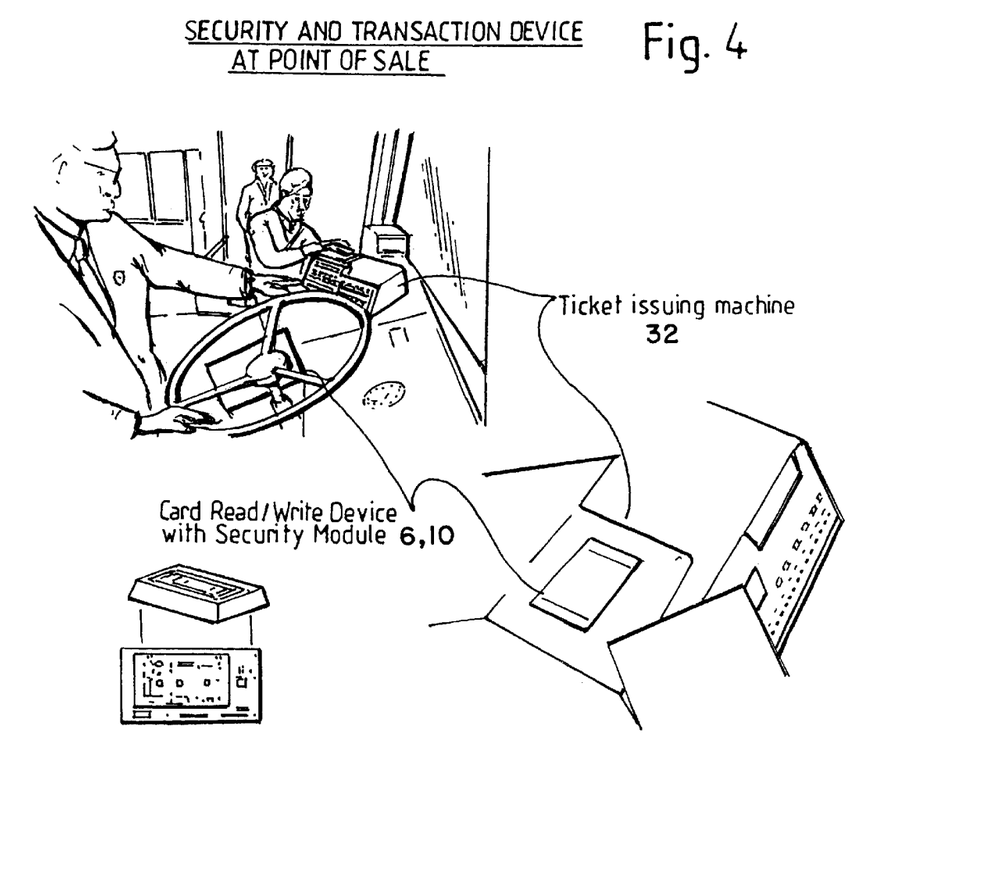
FIG. 4 is an illustration of a layout of a driver's cab of a bus in which the card charging system, including a ticker issuing machine, is installed.

Referring next to FIG. 4, there is shown a typical layout of the driver's cab in a bus, the cab including the card read/write device 10 with security module (TSM) 6 housed within the ticket issuing machine 32. A box on top of the ticket issuing machine 32 comprises the card reading device 10, which is connected to the TSM 6, which in turn is connected to the host device 4.

Figure 6:
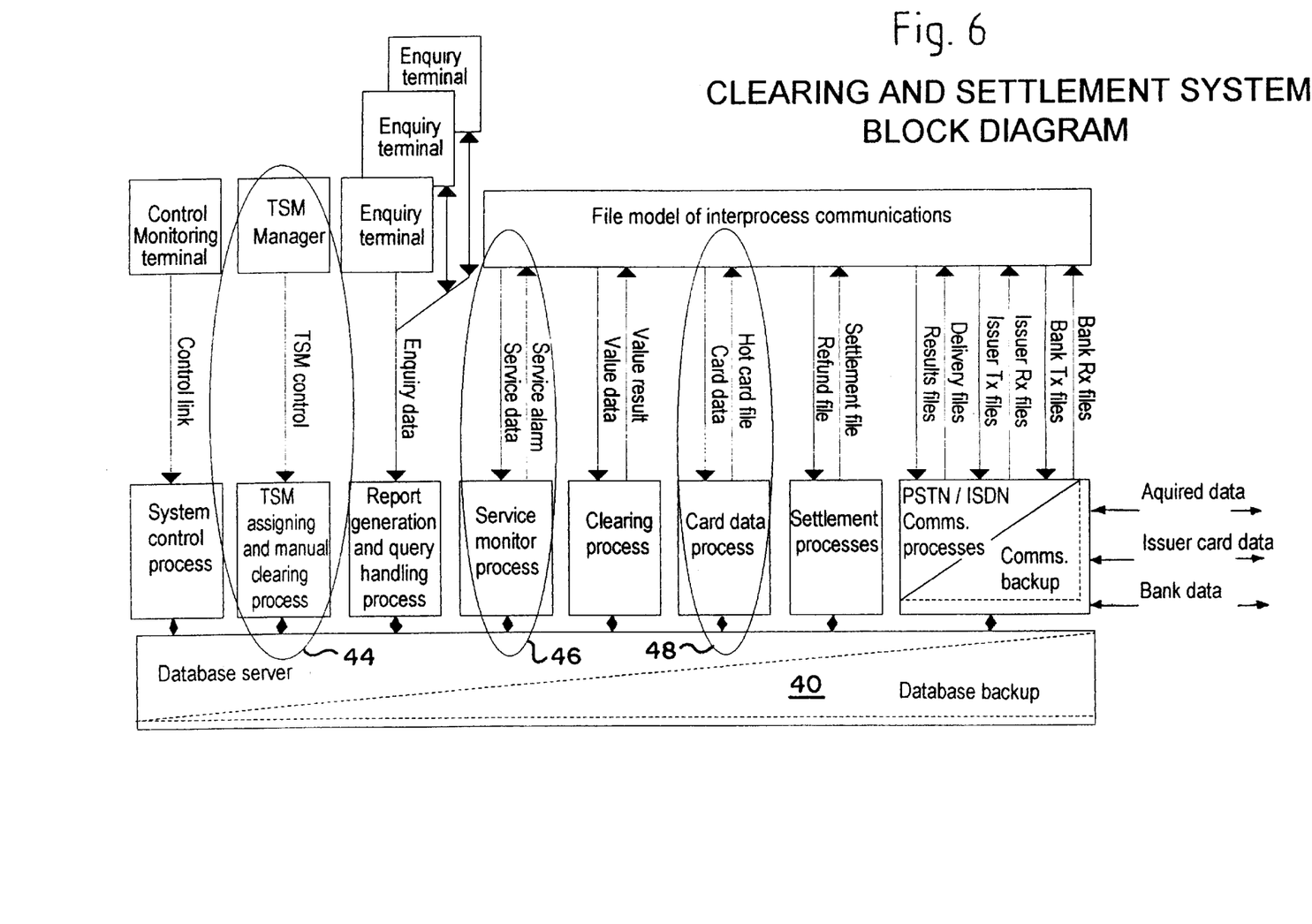
FIG. 6 is a diagrammatic illustration of a clearing and settlement system for use with the card charging system.

In FIG. 6 of the accompanying drawings, there is shown the card charging system represented as information files linked to a shared information data base 40 by a series of functional processes 42. Parts of FIG. 6 of the accompanying drawings are ringed by rings 44, 46, 48 to signify those functions described in greater detail in the following description.

Figure 5:
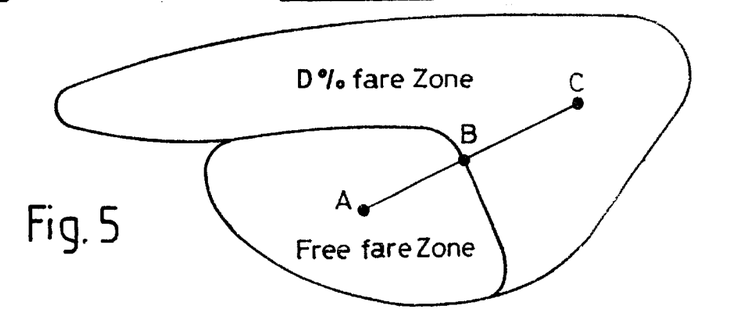
FIG. 5 is an illustration of concessionary fare zones.

In the case of partial concessions for example as depicted in FIG. 5, the security module (TSM) 6 is operable to obtain information to deal with revenue apportionment from the ticket machine 32. The user of the system 2 informs the driver or operator of the machine 32 of his or her intended destination. Such destination information is then keyed into the host device 4, which calculates an appropriate fare due on the basis of the concessionary scheme rules. The rules are defined by the concession scheme operator. The TSM 6 then stores information which comprises the difference between the full fare and the fare paid, namely the amount of reimbursement due to the operator for the journey undertaken. The user does not have to use a credit card to make payment in addition to using the concessionary contactless card, but could use cash, tokens or E-purse as a means of payment. The user is informed of the payment necessary by the operator of the ticket machine 32, this information being produced by the ticket machine 32 as described above.

Figure 7:
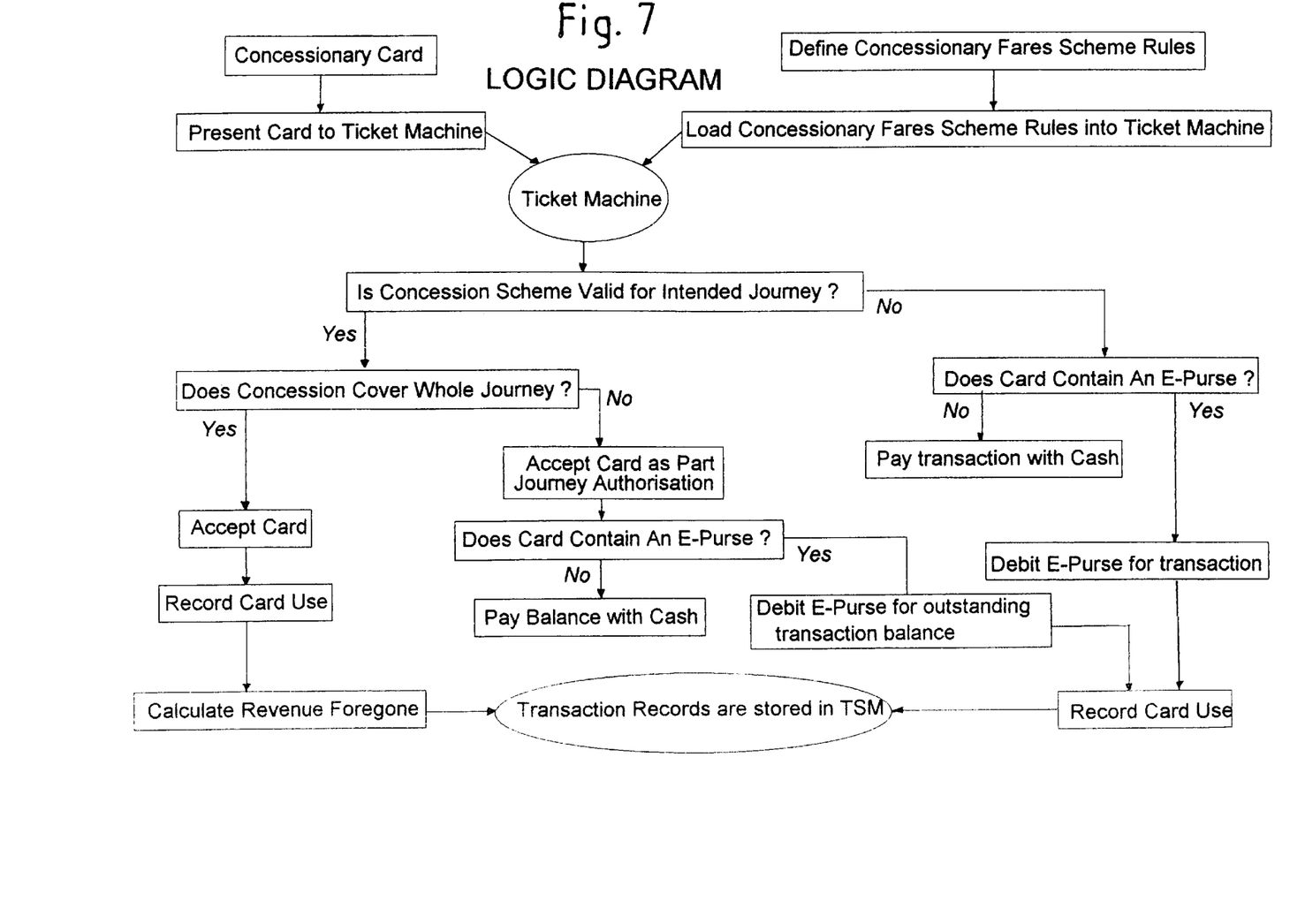
FIG. 7 is a flow diagram of logic operations carried out in the ticket issuing machine.

FIG. 7 is a flow diagram of the logic operations carried out in the ticket machine 32, the machine 32 being programmed with a set of rules of a concessionary fares scheme.

Assuming a concessionary card is presented, the machine 32 detects if the card is valid for the entire journey. If the card is valid, the machine 32 accepts the card, records its use, calculates the revenue foregone and stores a record thereof in the TSM 6. If the card is valid for only part of the journey, the machine 32 detects if the card holds an emergency purse (E-purse) credit, and either debits the E-purse appropriately or asks for a cash payment, having calculated the amount due on the basis of the rules. If the card is not valid at all for the journey to be made, then either an E-purse credit deduction is made or a cash payment is requested. E-purse debits are also recorded in the TSM 6.

It is thus made possible to issue a "multi-class concession" where, for example, the first part of a journey is free and the remainder is part paid. The host device 4 is able to determine the boundary along a route where a split is made and apply the concessionary rules separately for each part of the journey as illustrated in FIG. 5 of the accompanying drawings. For example, for a journey to be made by a user from A to C in FIG. 5, there is determined in the system 2:

(a) an amount to be paid by the user;
(b) a fare (A to C)−Fare (A to B)×D% where negative numbers are treated as zero value;
(c) amounts stored in TSM 6;
(d) a fare (A to B), namely a value 0 to be stored in "free fare class" concession group total; and
(e) a fare (A to C)−Fare (A to B)×(100−D)% in D% class concession group total.

If the card also carries stored values, then the amount paid by the user is stored in the card issuer total as normal.

The TSM 6 stores the difference between the full fare paid and the actual fare paid in separate non-volatile storage devices provide for each class of fare. In principle this concept can be extended to any number of splits per journey and any number of classes.

Subsequently the system 2 applies a generation factor to the total collected in each non-volatile storage device as determined by the issuer of the card. It is this final value that is then apportioned between the card issuer and the service provider.

Figure 8:
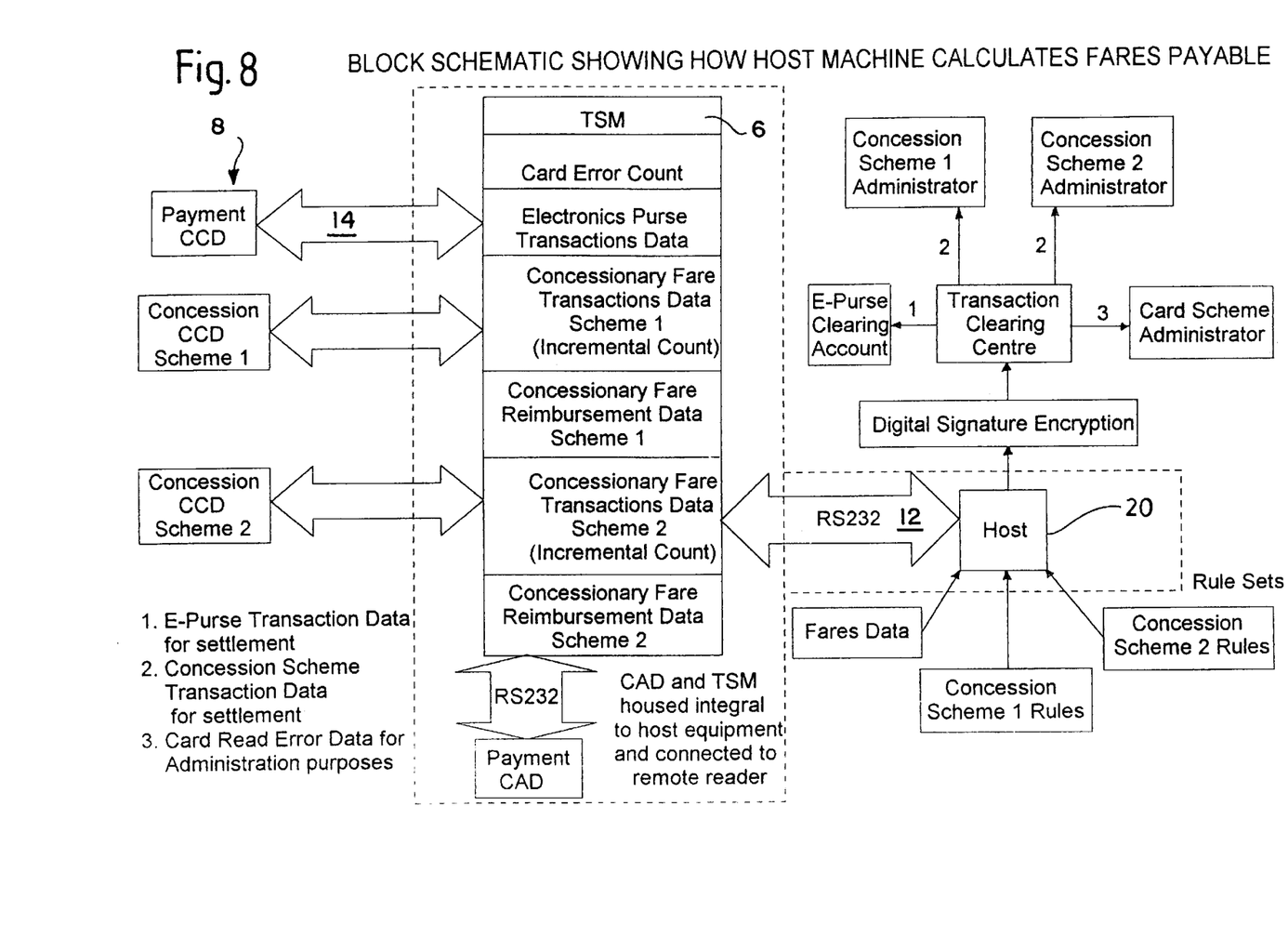
FIG. 8 is a schematic diagram illustrating steps performed in the card charging system when calculating fares payable.

FIG. 8 is a block schematic diagram illustrating how the host machine 32 calculates the fares payable. In this case, it is assumed by way of example that two concessionary schemes are in effect. The ticket machine 32 containing the rules applicable to the concession schemes, and also fare data, having received information from the card reader 10 via the TSM 6, correctly distributes revenue amounts to the accounts of the two concessionary scheme administrators and the card scheme administrator, as well as an E-purse clearing account via a transaction clearing centre. The TSM 6 contains the aforesaid non-volatile devices for accumulating the totals due in respect of transactions made under the concessionary schemes and in respect of E-purses, as well as a card error storage device.

The cards issued for concessionary fares desirably use a scheme developed to allow maximum flexibility in operation. A rule set number is encoded on the card which is used to define the many options that are available for determining the applicability of a concessionary fare. As the conditions that apply to concessions may be altered or periodically added to, the system 2 is able to accept new rule-sets or modifications to existing rule-sets at any time.

The principle adopted in the use of rule-sets is as follows:

The rule set number derived from the card indexes entries in a table of options is periodically loaded into the host facility.

For example, the following Table 1 may be taken as a reference model. "Extra" items are to be decided later; zero entry implies that the item listed is ignored.

TABLE 1

Rule set for use in the host facility 2

The mathematical operations = are valid
The logical operators + (OR) and * (AND) are also valid
The maximum number of logical operators per item is to be determined
The maximum number of different rule-sets per host is to be determined
The maximum number of classes is 8 (1–8)
The definitions for classes relating to the same group must not conflict.

In addition to the use of totals held in the TSM 6 for value transfer information, a number of non-volatile storage device totals are allocated for purposes of card scheme health monitoring. Normal transaction clearing systems do not carry any information that allows for the remote monitoring of the performance of card accepting equipment, whereas the scheme now proposed incorporates basic service performance checks within its value transfer protocol.

For example, each time a card is not read correctly, namely data integrity checks have failed, a "card read error" non-volatile storage device total is incremented. By virtue of the same mechanism that determines the amount of value to be apportioned by the system 2, the difference between the previous and current value of this non-volatile storage device total shows the instances of errors during a period. The following are examples of such non-volatile storage devices in operation.

For the purposes of monitoring the operation of a card scheme, non-volatile storage devices are reserved for carrying performance data back to the control system 2.

Where the card charging system 2 includes performance monitoring means, the issuer identifiers defined for the operation monitoring information, and the rules that determine use are preferably as follows:

A. Read/write performance

Rules for use are as follows:

A value field is incremented by 1 for each instance where a contactless card is unable to be read correctly and incremented by 100 if it is a contact card.

Incorrect reading of a card means that data was obtained from the card but the integrity check on that data failed. Such failure does not however necessarily mean the card could not be authenticated, or failed to make connection, or was rejected for other reasons.

The transaction field is incremented by 1 if a read after write check failure is encountered on a contactless card and by 100 for a contact card.

A read-after-write fail is recorded only if the data is known to be incorrect after any retry attempts have been made, namely if a card loses contact after or whilst being written then no failure is assumed. Anti-tearing mechanisms can be included to allow subsequent recovery.

Use of different increments, for example 1 and 100 to signal in a single counter the occurrence of differing events, is considered as a convenient way to maximise non-volatile storage utilisation and may be extended to multiple events in a single counter providing an appropriate series of increment numbers can be used.

Providing a suitable weighting is applied to the increments that indicate each differing event, namely a smaller increment for events that are most likely to occur, and the difference between current and previous absolute values of the counter is computed regularly, for example as is the case for a normal clearing cycle, then no confusion arises between the type of event being recorded.

B. Power and transmission performance

Rules for use:

A value field is incremented by 1 for each instance of transmission failure.

A transmission failure means that data communications between the CADs 8 or host device 4 and the TSM 6 could not be recovered and have "timed out". Such "timing out" does not mean the card or host protocols have necessarily suffered from and subsequently recovered from instances of corruption.

The transaction field is incremented by 1 every time the power supply to the TSM 6 is interrupted long enough for an internal TSM 6 reset to occur. Care is taken to resolve the difference between a TSM 6 used with sleep mode enabled and one that is not.

C. Contact card usage

Rules for use:

A value field is incremented by 1 for each instance where a contact card is unable to be ejected from the CAD 8.

This is interpreted by the failure of the card present signal to de-activate after the release solenoid is energized or within 1 minute after the card is rejected if no release solenoid is fitted.

The transaction field is incremented by 1 if a contact card is removed from the CAD 8 after it has been authenticated but before it has been ejected by the host device 4.

Other non-volatile storage devices acting in analogous manner may serve for other checking purposes.

Figure 9:
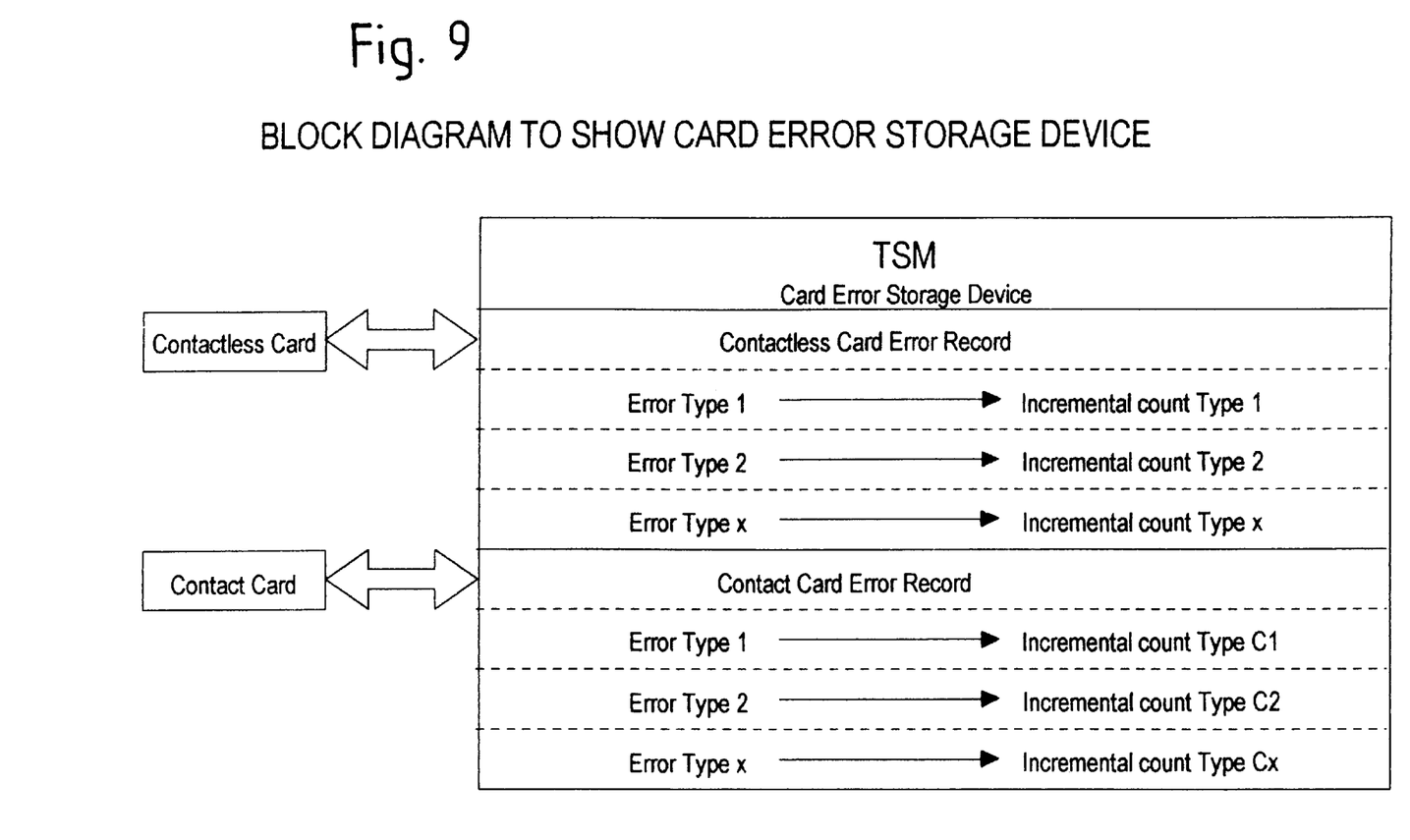
FIG. 9 is an illustration of a card error storage device included within the card charging system.

The card error storage device in the TSM 6 is exemplified by FIG. 9. Different types of error are separately counted in respect of contactless cards and contact cards and records are made for later analysis.

Figure 10:
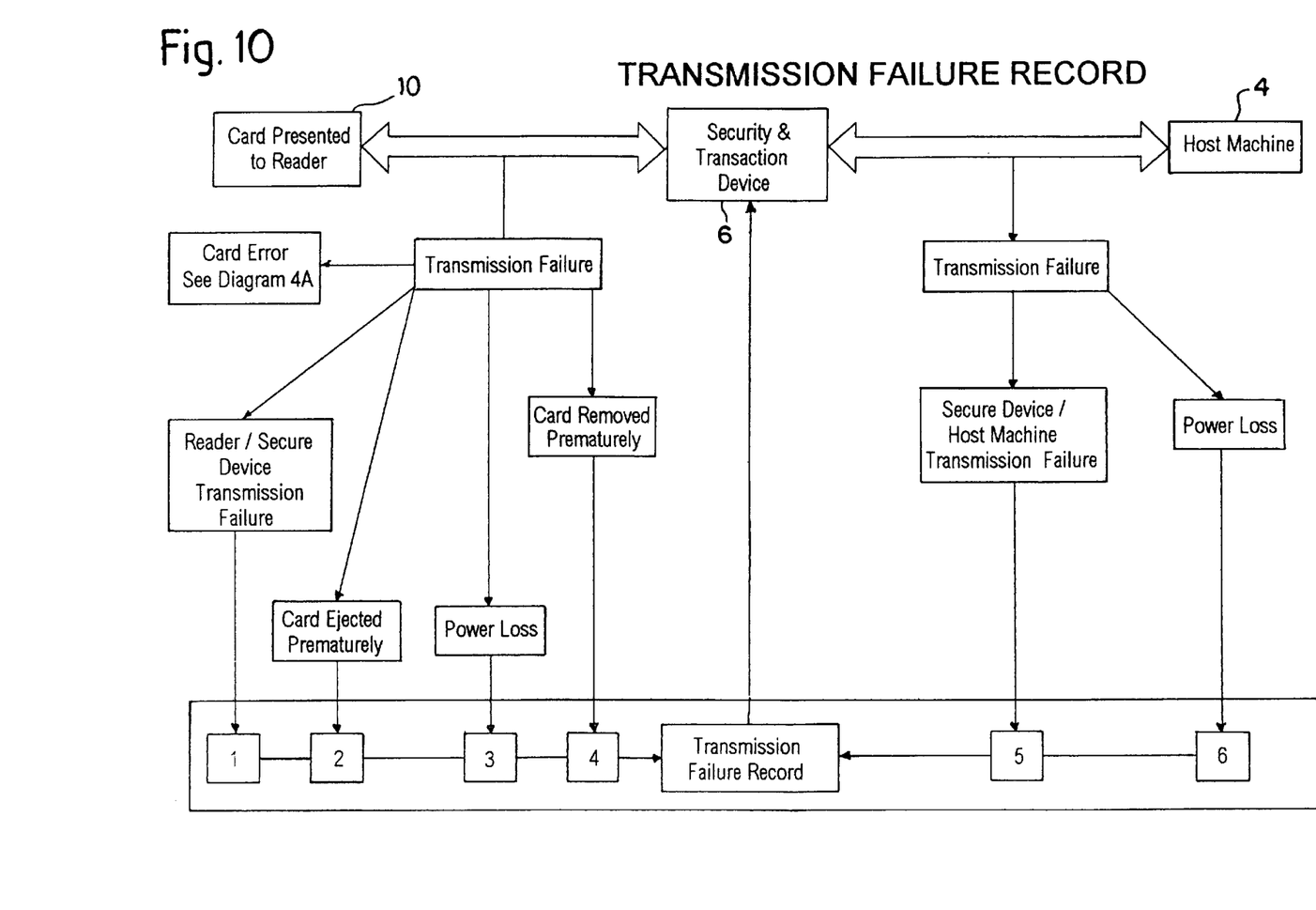
FIG. 10 is a card transmission failure record employed within the card charging system.

FIG. 10 shows the card transmission failure record employed within the arrangement of FIG. 8. It will be noted that two types of transmission failure can occur, between the card reader 10 and the TSM 6 and between the TSM 6 and the ticket machine 32 or the host device 4. The transmission failure record stores all the different kinds of failure of each type.

Features of the Data Communications System

The aforesaid non-volatile storage device protocol is such that signed totals of value, or other information, are sent to the clearing centre for interpretation. A channel by which the information is routed to the clearing centre is immaterial to correct operation of the system 2 providing that revenue is apportioned correctly in a timely manner. The system plan has inbuilt immunity to the following:

(1) Data corruption: The digital signature ensures that intentional or accidental substitution or alteration of the data during its route to the clearing centre is detected;

(2) Differential value: The entire clearing system is based on a system that apportions revenue based on the difference between previous and current values held in the TSPAs 6 at every point of purchase. This intrinsically makes the system fault tolerant;

(3) Lost data: If value from an individual or group of non-volatile storage devices is lost, then recovery takes place automatically the next time data is received;

(4) Duplicate data: If the same data is presented twice to the clearing system then the net result is zero and no revenue apportionment takes place; and (5) Old data: If earlier data is presented to the clearing system then the net result is negative and no revenue apportionment takes place.

The inherent fault tolerance of a system embodying these features of the invention coupled with the ability to detect data that has been tampered with, means that the clearing system can function reliably even if an unreliable communication channel is chosen. As a consequence the Internet is envisaged as a cost effective global infrastructure that can be used.

Fraud Detection and Card Tracking

It is inevitable that systems using cards that have potentially global acceptance will come under attack from fraudulently created/simulated cards. As part of the potential fraud detection mechanism, the system is able to adopt transaction tracking.

To this end each card is provided with a unique serial number which will be stored along with its remaining value in the TSM module 6. This information is transmitted to the clearing centre (TCC) via the same channel as currently used for the "gas meter" data (an additional record type is envisaged).

The TSM 6 module is capable, for example, of holding in non-volatile memory details of the last 1,000 transactions carried out through that TSM 6. Preferably it is possible to select whether the latest 100 or 200, for example in steps of 100 up to the full 1,000 transactions, are sent via the host equipment to the clearing centre, along with the totals. The tracking information can then be forwarded to the issuer or agent acting on behalf of the issuer to maintain a data base of card usage.

By this means either the operator, namely the host facility 2, or the issuer, will be able to keep a data base of the approximate value remaining on any pre-paid card used in the system 2. This data base will allow the operator or the issuer the ability to:

(a) Refund value on failed cards, such refund assuming the user returns the card and its serial number is visibly printed on the card as is the case for many telephone cards; and/or (b) Spot the use of cloned cards where either values are reported out of chronological order, or appear in multiple geographic locations at the same time.

Transaction tracking also compensates for the loss of visual marking of the remaining balance on the card and previous transaction data recovery, both of which are only economically possible with the current magnetic cards.

As part of the security of the system the allocation of TSM's 6 to service providers may be inextricably linked to the clearing system. Each TSM 6 module is uniquely coded and assigned to a given service provider when installed, this assignment provides the link by which any revenue collected is correctly apportioned to the service providers.

If this link could be changed at will by the service providers or the operator, then system security would be compromised. In order to minimise the risk of incorrect or fraudulent re-assignment of TSM's 6, re-assignment is preferably arranged only to take place in conjunction with the physical presence of the TSM 6 which has to be directly connected to the clearing computer.

Card and Transaction Tracking

More generally, therefore, because the TSM 6 records each individual use of each smart card, and because the clearing centre has a record of the location of each TSM 6, the exact time and location of each smart card transaction can be recorded, as well as any remaining value on the smart card.

This enables a log of card use to be maintained which will identify any inconsistencies in the transaction record relating to the card value, location of transaction and time of transaction, which would flag up possibly "copied cards" in the system 2, which can then be regarded as "hot cards" and therefore rendered invalid. "Hot cards" correspond, for example, to stolen cards.

Figure 11:
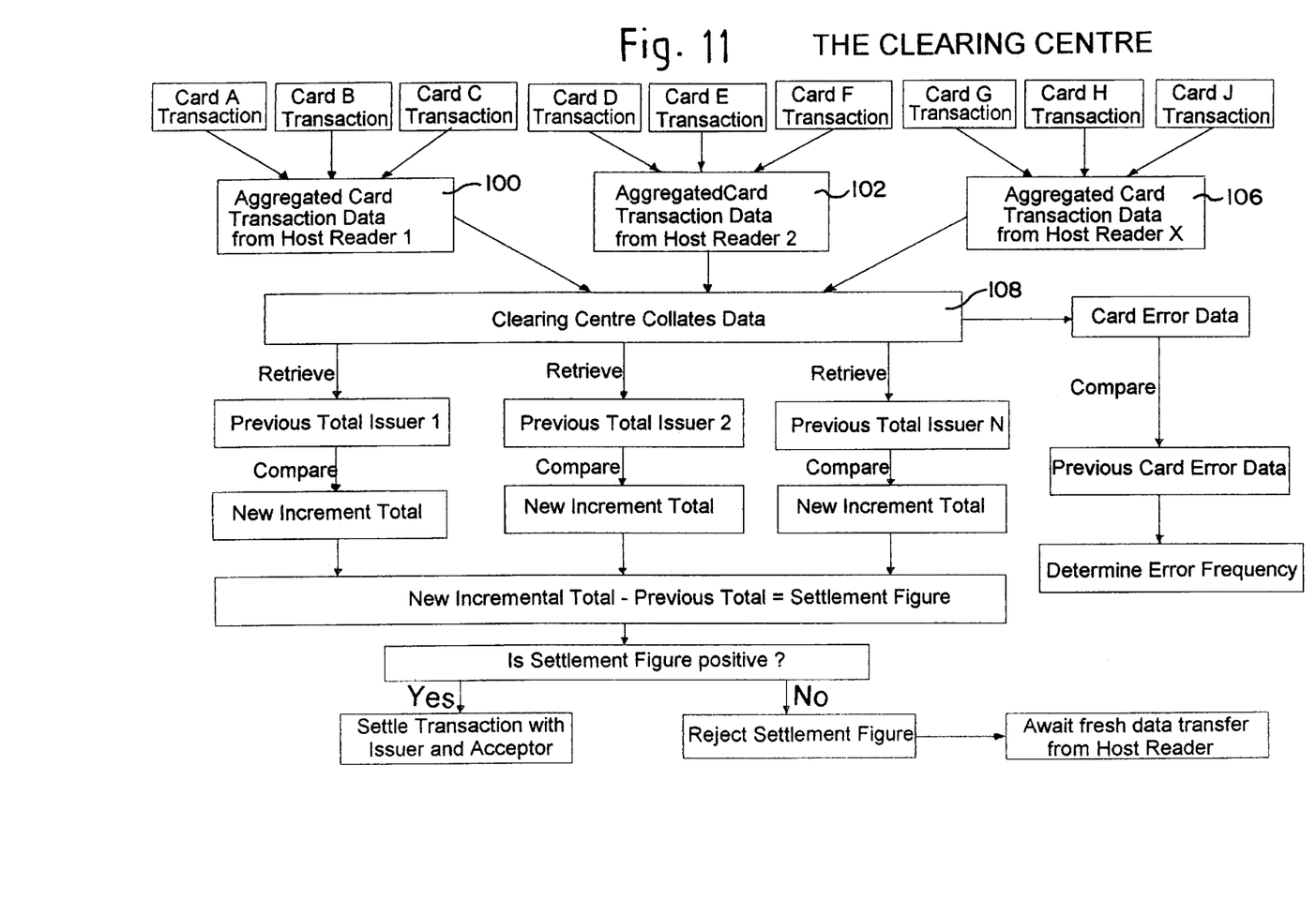
FIGS. 11, 12, 13 and 14 are illustrations of functions performed within the card charging system.

FIGS. 11, 12, 13 and 14 illustrate details of the functions performed within the clearing centre. Referring to FIG. 11, transactions notified from a plurality of host readers 102, 104 are passed to a data collator 106, from which previous totals for different card issuers are extracted and compared with newly incremented totals to obtain a revenue settlement figure which, if positive, is allotted to the appropriate account. It is also to be noted that card error data is analogously treated to determine card error frequency.

Figure 12:
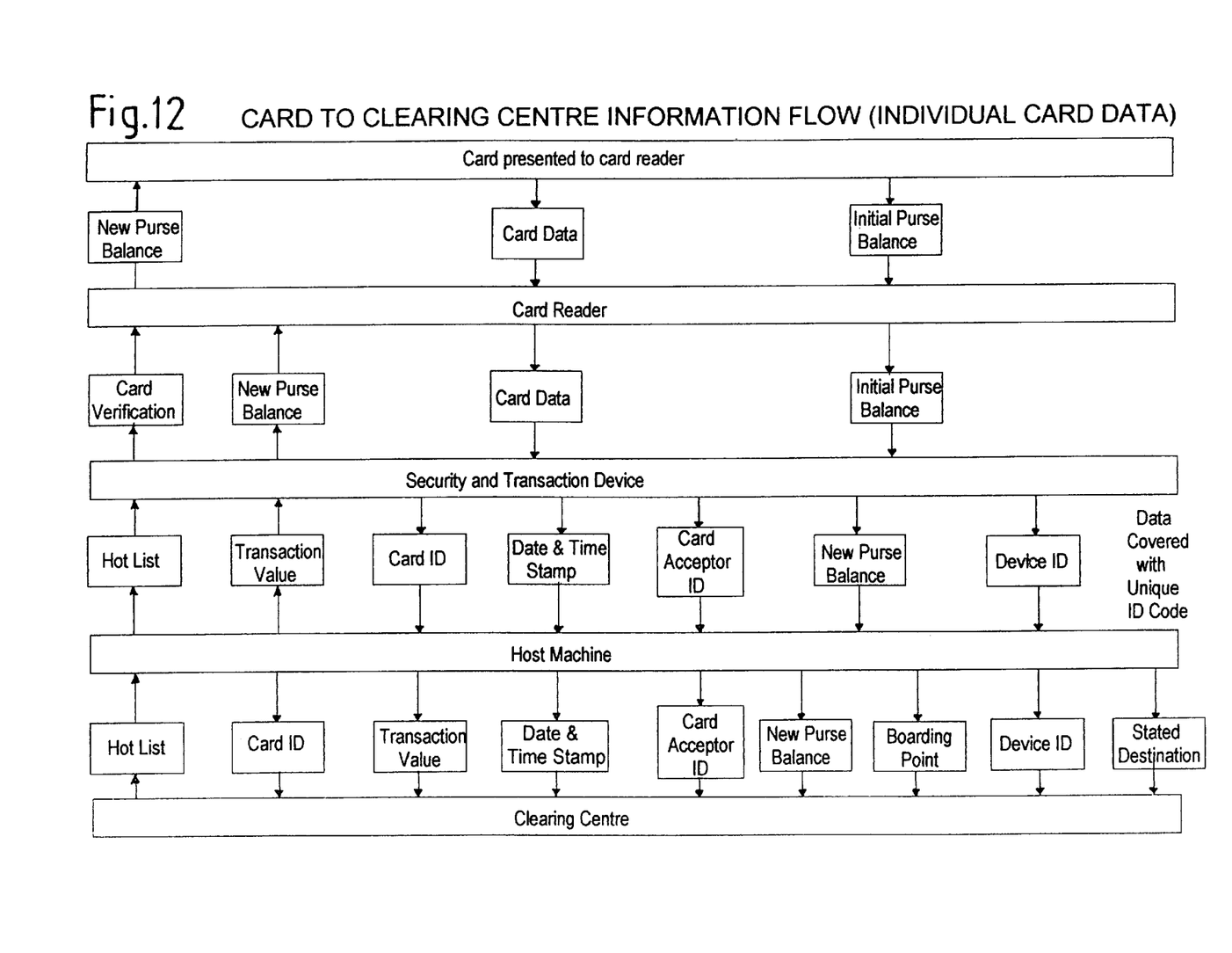

FIG. 12 is a flow chart showing the passage of information from a card reader to the clearing centre, for an individual card. It can be seen that the TSM 6 in effect times and dates each transaction, as well as handling fare amounts including E-purse deductions. This information is then passed via the host to the clearing centre, whereby the clearing centre is able to keep logs of card usage, times and dates of usage, amounts of transactions effected by use of individual cards and so forth.

Figure 13:
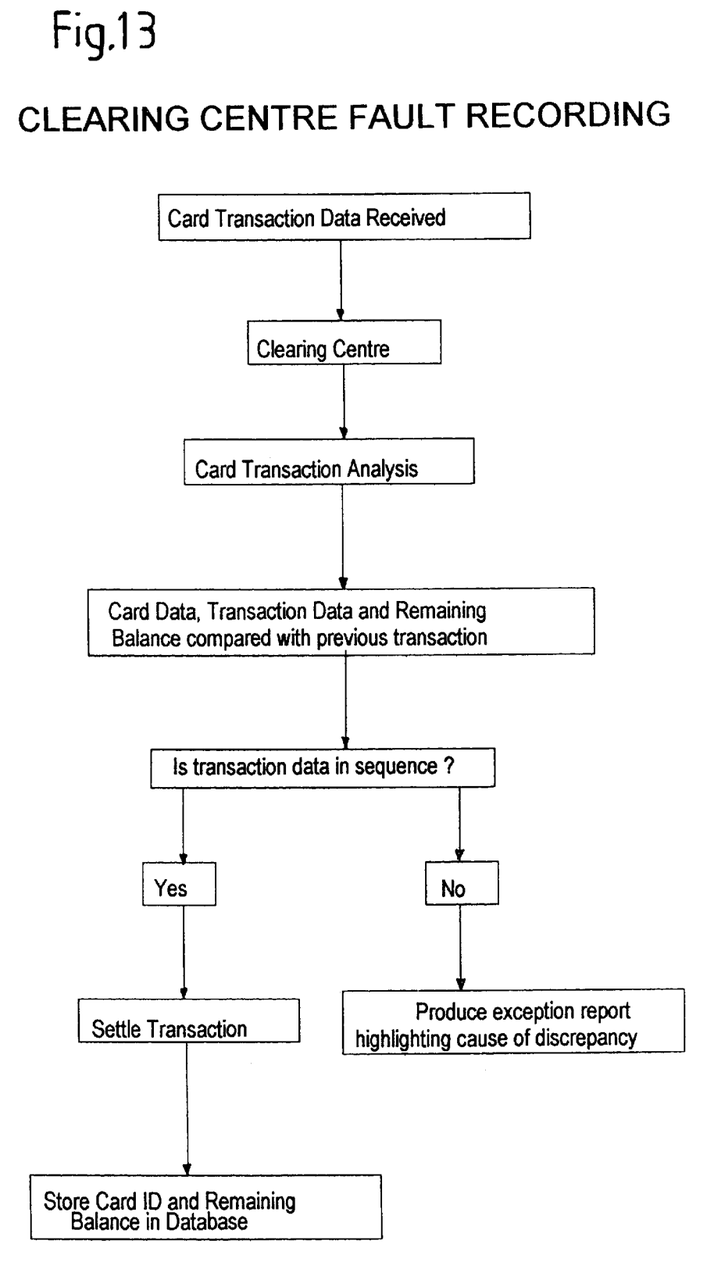

In FIG. 13 there is shown that the clearing centre also performs analysis of the logs referred to in connection with FIG. 12, checking that, having regard to times and dates, transactions occur in the correct sequence and an exception report is generated in the Case of a discrepancy. Additionally, card identities and revenue balances stored on cards are transferred to a database.

Figure 14:
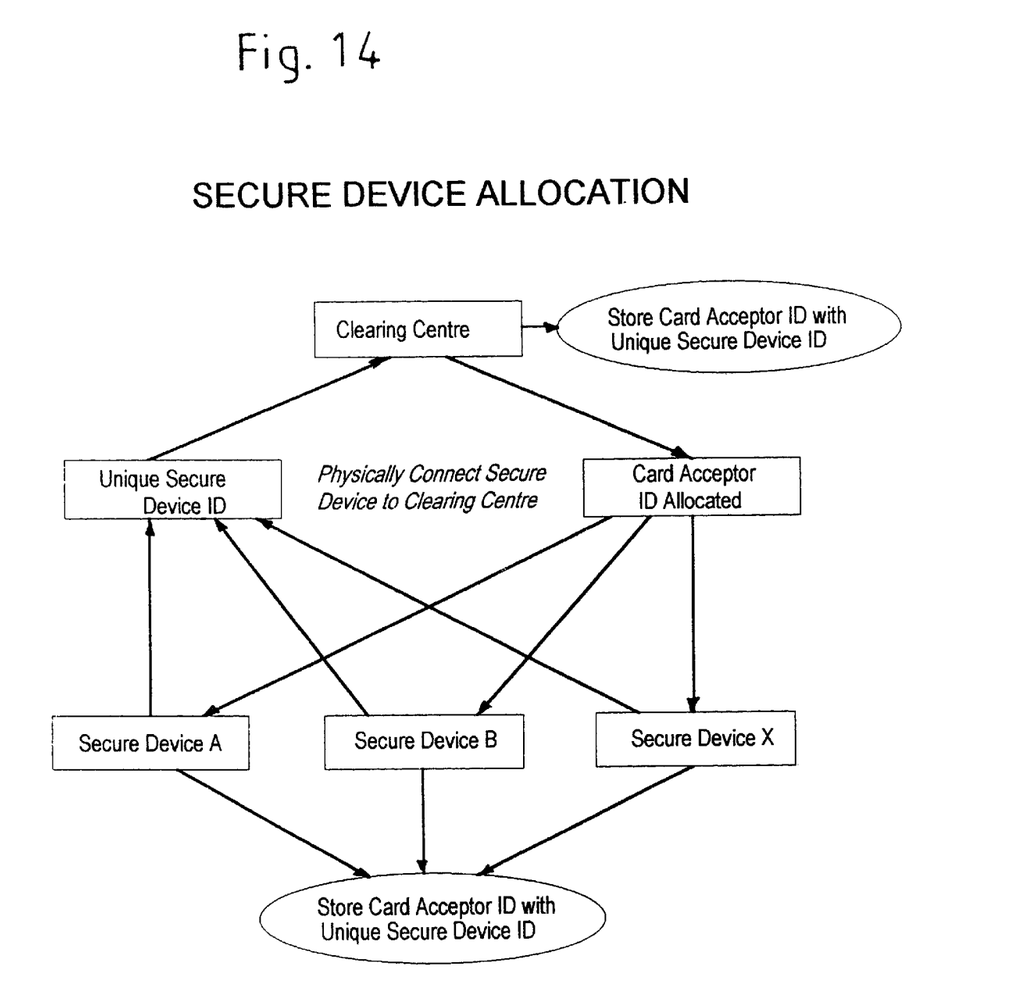

In FIG. 14, there is shown the manner in which the clearing centre handles the allocation of a unique code to each individual TSM, so that all transactions, data logging and so forth are carried out in conjunction with that unique code, thereby to ensure correct revenue apportionment for each particular TSM. In order to change the unique code of a TSM, it must be physically connected to the clearing centre, which allots a card acceptor identity in association with the unique TSM identity to the particular TSM with which it is connected.

What is claimed is:

1. A card charging system comprising:

(a) one or more smart card reading devices;

(b) a transaction recording-payment facility; and (c) one or more security modules located between the one or more reading devices and the transaction recording payment facility, the transaction facility operable to receive signals from the one or more security modules to enable a purchase to be made in return for an amount of credit debited from a smart card, wherein the one or more security modules record individual use of the smart card in respect of time and amount debited, the system further including a clearing centre to which information is transmitted from the one or more security modules to order the clearing centre to keep a record of the location of each security module, whereby the clearing centre is enabled to keep up to date a log of individual smart card usage, the clearing centre log including the time and location of each smart card transaction, as well as any remaining credit on the smart card, and wherein the clearing centre incorporates means for identifying any inconsistencies in the log with respect to the smart card credit and the locations and times of transactions.

2. A card charging system according to claim 1, wherein the clearing centre log includes the exact time and location of each smart card transaction, as well as any remaining credit on the card.

3. A card charging system according to claim 2, wherein the clearing centre incorporates means for identifying any inconsistencies in the log with respect to the smart card value and the locations and times of transactions.

4. A card charging system according to claim 2, wherein the clearing centre has means for flagging cards giving rise to inconsistencies in the log.

5. A card charging system according to claim 1, wherein the clearing centre stores the remaining credit on the smart card in association with a serial number allotted to the card.

6. A card charging system according to claim 1, wherein the one or more security modules are able to store data relating to a large plurality of smart cards and selectively simultaneously transmit some or all the data to the clearing centre.

7. A card charging system according to claim 1 wherein the card reader is a smart-card contactless card reader.

* * * * *